United States Patent [19]

Brewer et al.

[11] 4,022,077

[45] May 10, 1977

[54] CONTROL MEANS WITH A SPRING LEVER

[75] Inventors: Lloyd A. Brewer, West Terre Haute; Lynn R. Moseman, Terre Haute, both of Ind.

[73] Assignee: J. I. Case Company, Racine, Wis.

[22] Filed: Feb. 5, 1976

[21] Appl. No.: 655,386

Related U.S. Application Data

[63] Continuation of Ser. No. 489,787, July 18, 1974, abandoned.

[52] U.S. Cl. .................................. 74/473 R; 74/523
[51] Int. Cl.² ............................................ B60K 20/00
[58] Field of Search ............. 74/473 R, 475, 523, 74/543, 527; 192/89 R, 99 S

[56] References Cited

UNITED STATES PATENTS

| | | |
|---|---|---|
| 1,986,214 | 1/1935 | McWade ..................... 74/473 R X |
| 3,073,278 | 1/1963 | Brewster ..................... 74/473 R X |
| 3,481,437 | 12/1967 | Araikawa ......................... 192/89 R |

*Primary Examiner*—Samuel Scott
*Assistant Examiner*—Frank H. McKenzie, Jr.
*Attorney, Agent, or Firm*—Arthur J. Hansmann

[57] ABSTRACT

A control means with a spring lever for use in setting a set of gears in two different positions. The lever is of a spring material which is resilient and capable of being sprung into a position for storing energy whereby the lever will urge the gears into one position, or the lever will hold the gears in one position, to the extent of the spring force available in the lever. A plate member engages the handle of the lever and has two positions for holding the lever in either of the two positions, and the plate is adjustably mounted.

9 Claims, 3 Drawing Figures

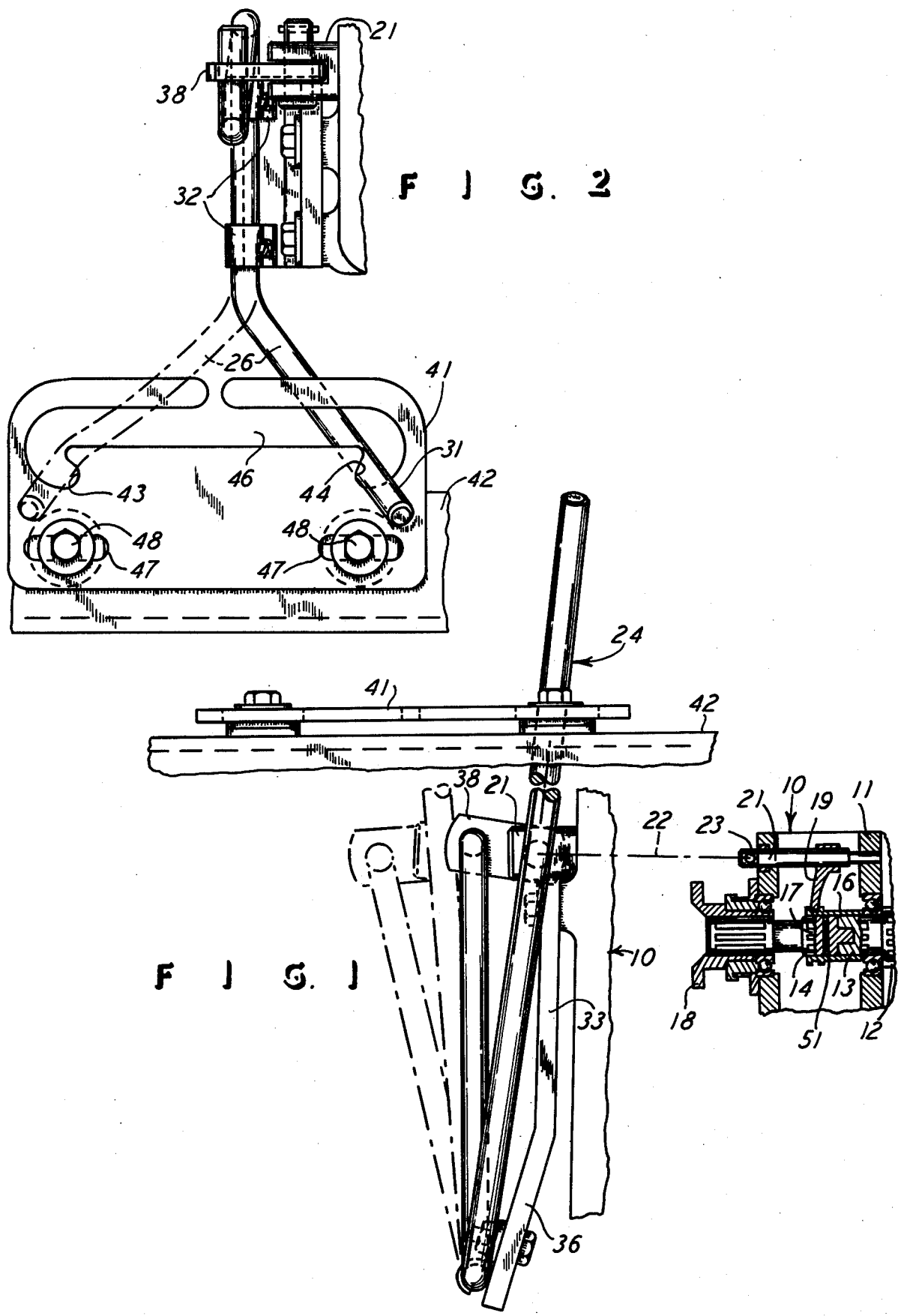

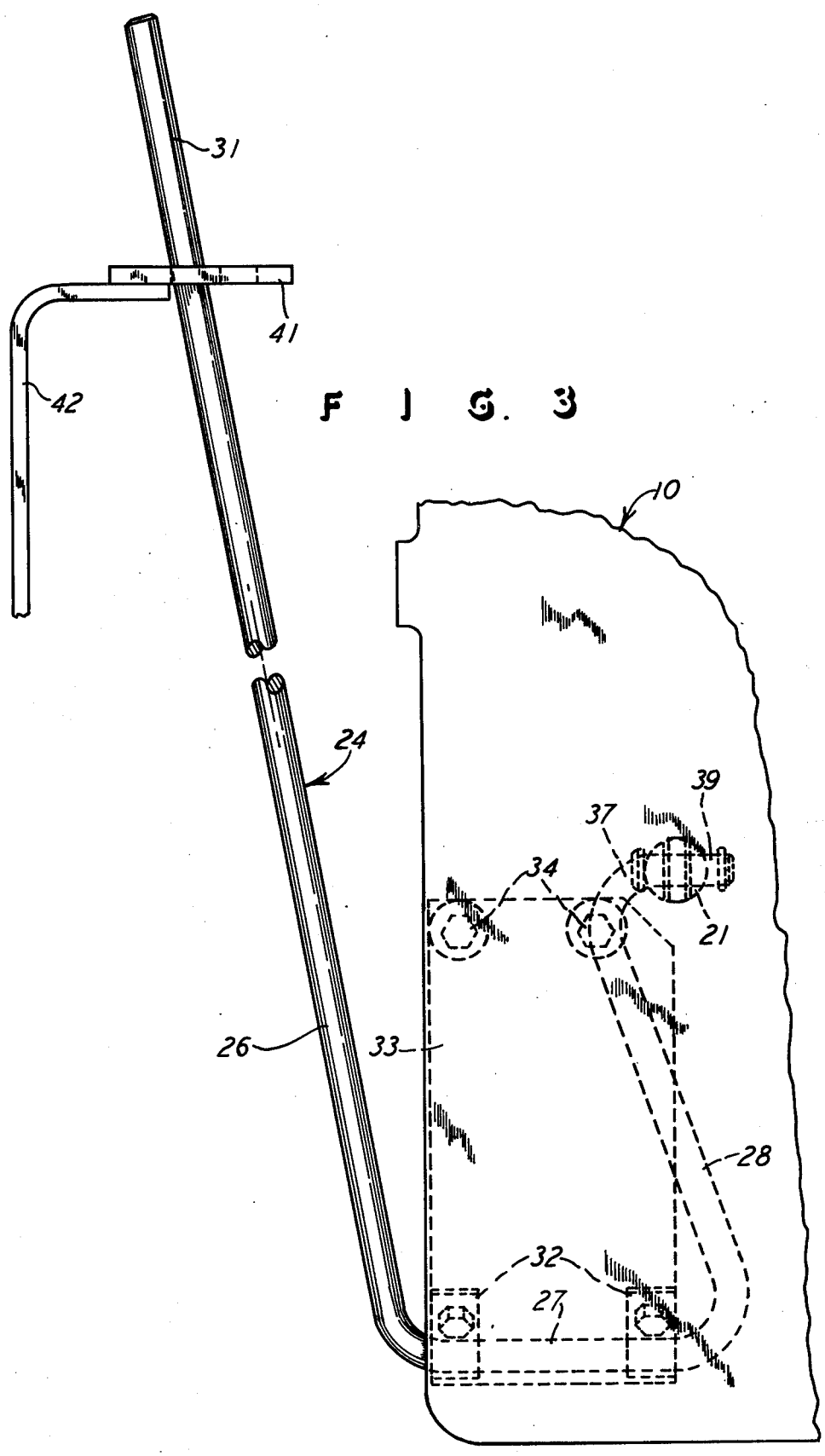

CONTROL MEANS WITH A SPRING LEVER

This is a continuation of application Ser. No. 489,787, filed July 18, 1974, now abandoned.

This invention relates to a control means with a spring lever, and more particularly, it relates to a spring lever for connectable with a set of gears for yieldingly urging the gears to either a meshed or a free position relative to each other.

BACKGROUND OF THE INVENTION

The invention has particular utility in providing a control means for positioning a set of gears, such as gears in a vehicle transmission, and thus the invention is disclosed and described in that context. That is, with regard to tractors, it is a common occurrence that it is desirable to have the transmission gears positioned in a disengaged relation, that is in the neutral position, so that there is no drive connection between the engine and the tractor differential or drive axis. The neutral or disengaged position is desirable when the tractor is to be towed or otherwise placed in the gear-disengaged position, and the prior art already utilizes gear sets and vehicle transmissions where it is common practice to set the gears in the disengaged position.

However, there is a problem in moving the gears to either the engaged or disengaged portion, and the problem with regard to disengaging the gears arises when the force between the gears is sufficient to hold the gears in the engaged position and against the effort of disengaging those gears. When that occurs, it is common practice to endeavor to move the tractor, such as by pushing or rocking the tractor, while holding the control or lever which may create the movement of the gears for disengaging them. However, with that prior art approach, one must continuously hold the shift or control lever until the force between the gears is overcome and the gears can then be moved to the disengaged position.

With the present invention, a lever is provided for permitting the lever to be set in say the disengaging position, and the operator then need not continue to hold the lever while the rocking or pushing or driving of the tractor is occurring. With this arrangement, the gears will then automatically and immediately move to the disengaged position when the force between the gears is reduced, such as by the rocking or driving action, and the lever which is in the disengaged position will automatically move the gears for disengagement.

Accordingly, it is an object of this invention to provide a control means which will automatically disengage the gears, without requiring that the operator retain his hold on the lever while the disengaging action is occurring. In accomplishing this object, a lever of a spring material is utilized, and the lever can be set so that it has energy stored therein, by virtue of spring characteristics of the lever, and thus the automatic lever action or disengaging action will occur. This permits the driver to be in any other location, rather than being only in a position of holding the lever throughout the entire disengaging process.

Still another object of this invention is to provide a simplified but sturdy and reliable control means or lever which automatically acts to disengage the gears of a set of gears or a vehicle transmission when the force between the gears is sufficiently reduced, such as by moving the gears in their driving relation, and such movement may be achieved by driving or rocking or pushing a vehicle in the event that it is transmission gears that are being maneuvered either for the disengagement or the engagement of the gears. In accomplishing this and the other objectives, the control means of this invention provides a safe mechanism for controlling the gears in that the operator need not be occupied simply with holding the lever or the like in the desired position until either engagement or disengagement is achieved.

Still further, it is an object of this invention to provide an automatic acting control means for engaging or disengaging gears of a set of gears and to do so without complex and special mechanism such as those operated by pneumatics or hydraulics or electricity or cables or linkages or the like. Further, even though no involved or expensive mechanisms are required, such as those mentioned, the control means of this invention operates under the supervision of only one person, and even that person need not be in direct contact with the central means, such as be holding a lever or the like, when the gear shifting is occurring.

Other objects and advantages have become apparent upon reading the following description in light of the accompanying drawings:

BRIEF DESCRIPTION OF THE DRAWINGS

FIG. 1 is a rear elevational view of a preferred embodiment of this invention, and showing it related to a fragment of a vehicle transmission.

FIG. 2 is a top plan view of the embodiment shown in FIG. 1.

FIG. 3 is a side elevational view of the embodiment shown in FIG. 1.

DETAILED DESCRIPTION OF THE PREFERRED EMBODIMENT

The drawings show the control means of this invention as it is related to a gear set which is generally shown as a fragment of a transmission designated 10, and this may be a transmission of a conventional vehicle, such as a tractor. The transmission has a housing 11 with a fragment of a gear 12 which is a driven gear in the transmission 10 arranged in a conventional manner. A splined section 13 of the gear 12 extends therefrom, and another splined section 14 is disposed adjacent the portion or section 13, and the two are rotatable separate from each other in certain conditions. A slidable sleeve 16 is disposed for engaging the spline members 13 and 14 to place them in driving relation to each other, such that, in the position shown in FIG. 1, rotation of the spline member 13 will transmit rotation to the spline member 14 through the interconnecting sleeve 16. Thus, in any conventional arrangement, there are two spline members with a conventional spline connector or sleeve slidable thereover for placing the two spline members in driving relation, and thus the sleeve 16 has internal splines for engaging the splines, such as those designated 17, on the exterior of the members 13 and 14, for the conventional driving relation therebetween. An output member 18 is included in the transmission 10, and a conventional drive connection can extend from the member 18 to the vehicle differential and axle and driving wheels, all in a conventional arrangement. The sleeve 16 is slidable over the members 13 and 14, as mentioned and as is conventional, and a control arm 19 connects with the sleeve 16 and moves with a shaft member 21, in order to move from the position shown in FIG. 1 and to a position to the left in FIG. 1, and that position shifted to the left would cause the sleeve 16 to be disengaged from the spline member 13 and thus interrupt the rotational drive relation between the members 13 and 14, all in a conventional arrangement. The foregoing describes a conventional gear set or transmission, and it will be understood that the shifting described may be between gears or it may be between the splined members shown and described, all within the knowledge and skill of one in the art, and thus further description or explanation is not necessary.

FIG. 1 further shows the control means of this invention as it is related to the transmission 10, and the dot-dash line designated 22 schematically indicates how the connecting end 23 of the member 21 is connected to the control means of this invention, and the member 23 is shown in its enlarged and connected position with a lever generally designated 24, in FIG. 1.

Thus all of the drawings show that the lever 24 is generally L-shaped, and it has its upright portion 26 and its horizontal portion 27 and its upright small-end portion designated 28. Further, the lever 24 is of a spring material and has a resilience which will permit the bonding of the upright portion 24 and which will permit the storage of energy, by virtue of the sprung condition throughout the lever 24, when the lever is set and maneuvered as described later.

The upright portion 26 terminates in a handle 31, and it will be noted that the upright portion 26 is of a substantial length considerably longer than the portions 27 and 28, and in fact it is at least three times longer than either section 27 or 28, but of course it is shown broken away in the drawings, except for the showing in FIG. 2.

The handle 24 is shown to be an elongated rod, and it is pivotally mounted through the pivot mountings designated 32 and which are shown to be tube clamp members which in turn are secured to a plate 33 mounted on the transmission by means of bolts 34. FIG. 1 shows that the plate 33 has an offset end 36 which is a free end and is spaced from the transmission 10, and the plate 33 is actually available for a spring action in the functioning of the control means, at least to the extent desired and as hereinafter explained with regard to the control means. Thus, the members 32 provide the pivot mounting for pivotally engaging the lever portion 27 and thereby permit the lever ends 26 and 28 to pivot about the axis of the section 27.

The lever end 28 terminates in an offset end 37 which is a connection portion of the lever for connecting to the member 21 of the transmission 10. Thus the lever end 37 extends into a link 38 which in turn connects to the transmission member 21 through a pin 39 extending through the link 38 and through the hole 23 in the transmission member 21.

At this point it will therefore be understood that pivotal action of the lever 24, on its pivot mountings 32, will cause the lever end 37 to move toward and away from the transmission 10 and thereby cause the engagement and disengagement of the drive action from the transmission 10, by virtue of the engagement and disengagement of the splined members 13 and 14, as described and as is conventional. FIG. 1 therefore shows a dot-dash position, that being the position to the left in FIG. 1, and in such position the member 21 would have been moved to the left, by action of the lever 24, and that would move the sleeve 16 to disengage the drive from the spline member 13 relative to the splined member 14.

To render the control means automatic, safe, reliable, and easily operated, all as mentioned in the aforesaid background of this invention, the lever member 24 is of suitable spring material so that energy can be stored in the lever 24 when the end 37 is held in one position and the lever handle 31 is in another position, and this can create a bending or spring force in the handle portion 26, as indicated in FIG. 2 in the dot-dash position of the section 26. Thus, a plate member 41 is adjustably mounted on the vehicle portion designated 42, and the plate 41 is therefore located a substantial and remote distance from the pivot mountings 32. The plate 41 has two notches or restraining positions designated 43 and 44 which are spaced apart a certain distance and which are interconnected through a slideway or slot 46, as seen in FIG. 2. The lever handle 31 is of a size sufficient to project into the slot 46 and extend above the plate 41, and thus the operator may grasp the handle 31 and position it in either notch 43 or 44 or in the slot 46, as desired. FIG. 2 shows the lever 24 in the notch 44, in the full line position, and this position is indicated as one urging the lever end 37 to an inward position, relative to the transmission 10, and thus creating a drive connection between the splined members 13 and 14, and this therefore positions the sleeve 16 in the position shown in FIG. 1. Conversely, when the lever 24 is placed in the dot-dash position shown in FIG. 2, then the lever end 37 would tend to move away from the transmission 10, as shown by the dot-dash position of the lever in FIG. 1, and this would cause the transmission splined sleeve 16 to slide off the splined member 13 and thus disconnect the drive between the members 13 and 14.

It will be further noted that the plate 41 has elongated slots 47, and mounting bolts 48 extend through the slots 47 and into the tractor portion 42, and the slots 47 extend parallel to the slot 46 and thus parallel to the shifting movement of the lever portion 26, and therefore the slots 47 are adjustments which permit the setting of the plate 41 and thereby permit the setting of the lever 24 relative to the engagement and disengagement engagement of the gears or splines in the transmission 10.

With the arrangement described, it will therefore be understood that the operator can position the lever handle 31 in either notch or position 43 or 44 on the plate 41, and this can create a spring energy in the lever 24 by virtue of the fact that the splined members 13 and 14 may have substantial force on them through the sleeve 16, and thus the sleeve 16 will not slide and release or engage, whichever the case may be. However, when the vehicle is moved, or the gear set is actuated, then the force on the sleeve 16 may be sufficiently released so that the spring energy in the lever 24 will cause the sleeve 16 to shift and thereby create the desired new position. In doing this, the operator need not hold the lever handle 31, but he only needs to position the lever in either position 43 or 44, and the lever action thus becomes automatic. Also, the plate 36 may serve as a member for storing a spring energy to create the shifting action described and thereby assist the lever 24 in exerting its spring energy as mentioned.

The positions 43 and 44 are spaced apart in the directions transverse to the axis of pivot of the lever, namely, the longitudinal axis of the lever section 27, and the spacing of the positions 43 and 44 is within the resilience or spring characteristic of the lever, and thus the spacing of the positions 43 and 44 and the resilience and stored energy of the lever 24 are interrelated to achieve the function described herein. Further, it will be understood that the lever may act on a set of gears, and it may also act on the splined members shown and described herein, all within the understanding and knowledge of one skilled in the art, and the members 13, 14 and 16 can be considered to be gear members since there are teeth or splined sections interengaged and there will be a force created therebetween, and the spring energy in the lever 24 will overcome a reduced force in the teeth or splined members engaged. FIG. 1 also shows that the member 14 has a spring-loaded ball 51 which bears against the inside of the sleeve 16 to thus hold the sleeve 16 axially relative to the members 13 and 14, and the force created by the ball 51 is also overcome by the spring energy of the lever 24 in the action described herein, and the arrangement with the ball 51 is conventional and therefore need not be shown or described. In this instance, items 12 and 18 are gears being engaged and disengaged relative to each other. Also, the notches 43 and 44 could be labeled with appropriate indicia, such as, In and Out, respectively, to indicate the position of the lever 24 relative to the gears or splines being engaged and disengaged.

What is claimed is:

1. A control means with a spring lever for use in setting a device in two different positions, comprising a pivotally mounted lever of a spring material which is resilient and thereby capable of bending throughout its length to be recoverably sprung into a position for storing energy in said lever, said lever having opposite end portions extending on opposite sides of and away from the pivot mounting and with one of said end portions being a handle and with the other of said end portions including a connection portion arranged to connect to the device being controlled by said control means, and a member disposed adjacent the extending end of said handle and having two notches for lever-restraining positions and with said notches faced oppositely from each other and arranged and spaced apart in the directions transverse to the axis of pivot of said lever and spaced apart a distance within the bending capacity of said lever, for engaging said handle alternately in said two notches and thereby restrain said handle when said connection portion of said lever is cconnected to and restrained by said device, and said member having a slot extending between said notches for sliding movement and control of said handle in its movement between said notches.

2. The control means with a spring lever as claimed in claim 1, wherein said lever is L-shaped and has its comparable upright portion thereof defined by terminating in said handle, a pivot mounting engaged with the comparable horizontal portion of the L-shaped lever, and with the length of said lever along said upright portions thereof being greater than the spacing between said restraining positions on said member, for creating strong spring energy in said lever.

3. The control means with a spring lever as claimed in claim 1, including an adjustment mounting connected with said member, and with said member having adjustment movement in the directions of movement of said lever handle for adjustably positioning said restraining positions relative to said lever and thereby vary the restrained positions of said lever.

4. The control means with a spring lever as claimed in claim 3, wherein said member is a plate and it includes mounting slots extending parallel to the first said slot, and including mounting bolts engaged with said plate and extending through said mounting slots and thereby providing an adjustment mounting.

5. A control means with a spring lever, comprising a plurality of gears movably related to each other for movement into and out of driving engagement with each other, a pivotally mounted lever of a spring material throughout its length and capable of being flexed along its length for storing energy in said lever, said lever having opposite end portions extending on opposite sides of and away from the pivot mounting, one extending end of said lever being connected with one of said gears for movement of said gear relative to another of said gears, the end of said lever opposite said one end extending to an end portion presenting a handle maneuverable by a person for pivotal action of said lever, and a restraining member disposed adjacent said end portion and having two restraining positions arranged thereon and spaced apart in the directions transverse to the axis of pivot of said lever and spaced apart a distance within the bending capability of said lever, for engaging said end portion alternately at said two restraining positions and thereby restrain said end portion when said connection portion of said lever is connected to and restrained by said gears.

6. The control means with a spring lever as claimed in claim 5, including an adjustment mounting connected with said member, and with said member having adjustment movement in the directions of movement of said end portion for adjustably positioning said restraining positions relative to said lever and thereby vary the restrained positions of said lever.

7. The control means with a spring lever as claimed in claim 5, wherein said lever is L-shaped and has its comparable upright portion thereof defined by terminating in said handle, a pivot mounting engaged with the comparable horizontal portion of the L-shaped lever, and with the length of said lever along said upright portion thereof being greater than the spacing between said restraining positions on said member, for creating strong spring energy in said lever.

8. The control means with a spring lever as claimed in claim 7, wherein said member includes two notches for providing said restraining positions, and said member includes a slot extending between said notches for sliding movement and control of said end portion in its movement between said notches.

9. The control means with a spring lever as claimed in claim 8, wherein said member is a plate and it includes mounting slots extending parallel to the first said slot, and including mounting bolts engaged with said plate and extending through said mounting slots and thereby providing an adjustment mounting.

* * * * *